March 9, 1965   G. STIEFEL   3,172,556
MULTI-MATERIAL STORAGE AND TRANSPORT TANK
Filed Oct. 24, 1960   3 Sheets-Sheet 1
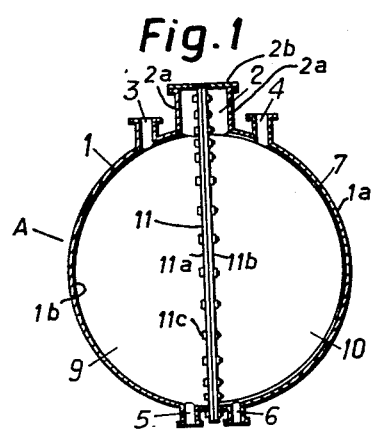
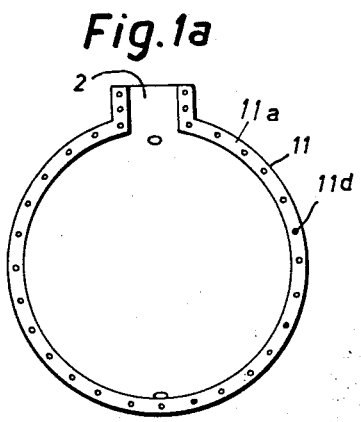
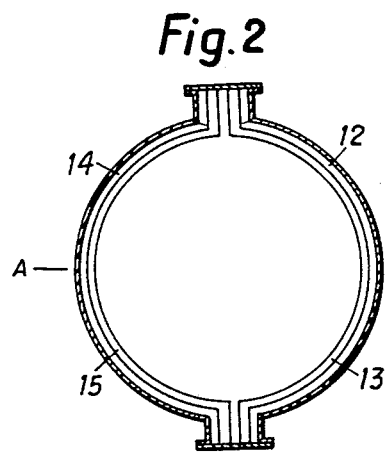
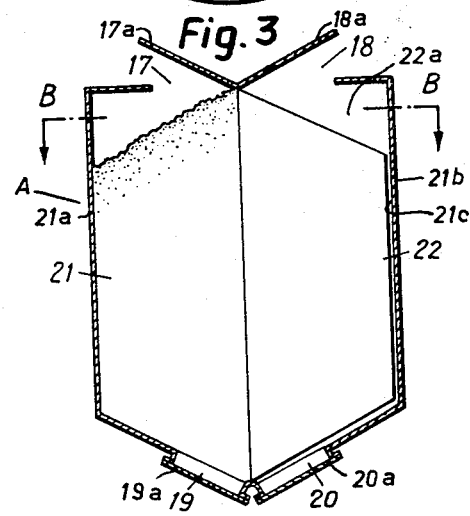
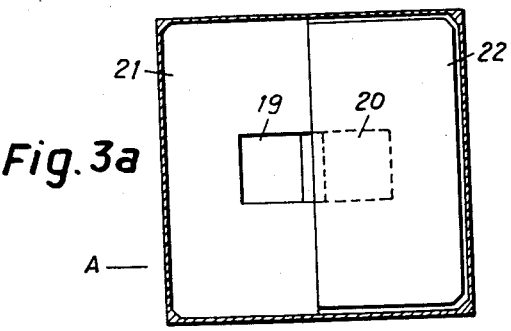
INVENTOR.
Gottfried Stiefel
BY Werner W. Kleeman
Attorney March 9, 1965 G. STIEFEL 3,172,556
MULTI-MATERIAL STORAGE AND TRANSPORT TANK
Filed Oct. 24, 1960 3 Sheets-Sheet 2
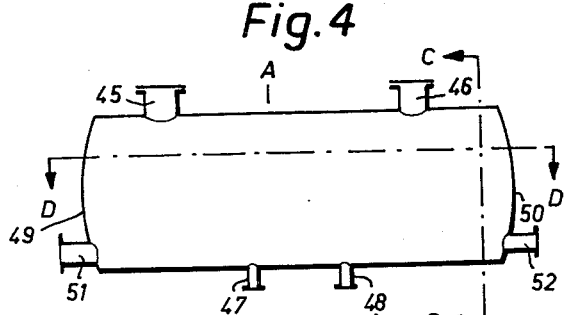
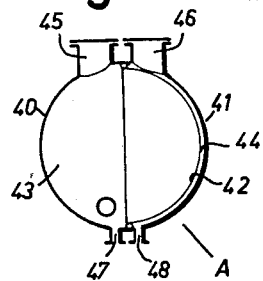
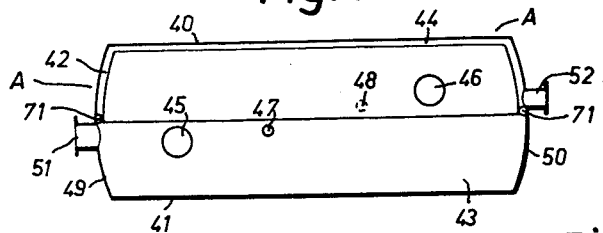
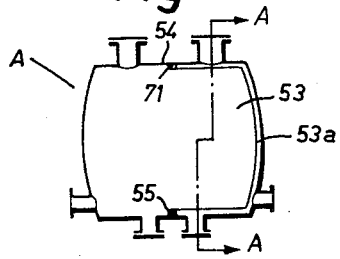
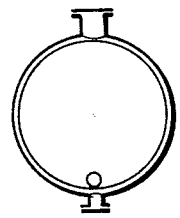
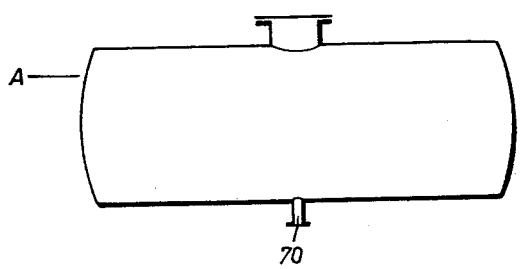
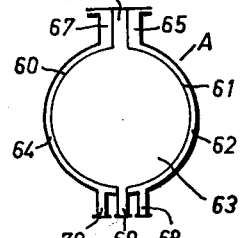
INVENTOR.
Gottfried Stiefel
BY Werner W. Kleeman
Attorney March 9, 1965  G. STIEFEL  3,172,556
MULTI-MATERIAL STORAGE AND TRANSPORT TANK
Filed Oct. 24, 1960  3 Sheets-Sheet 3
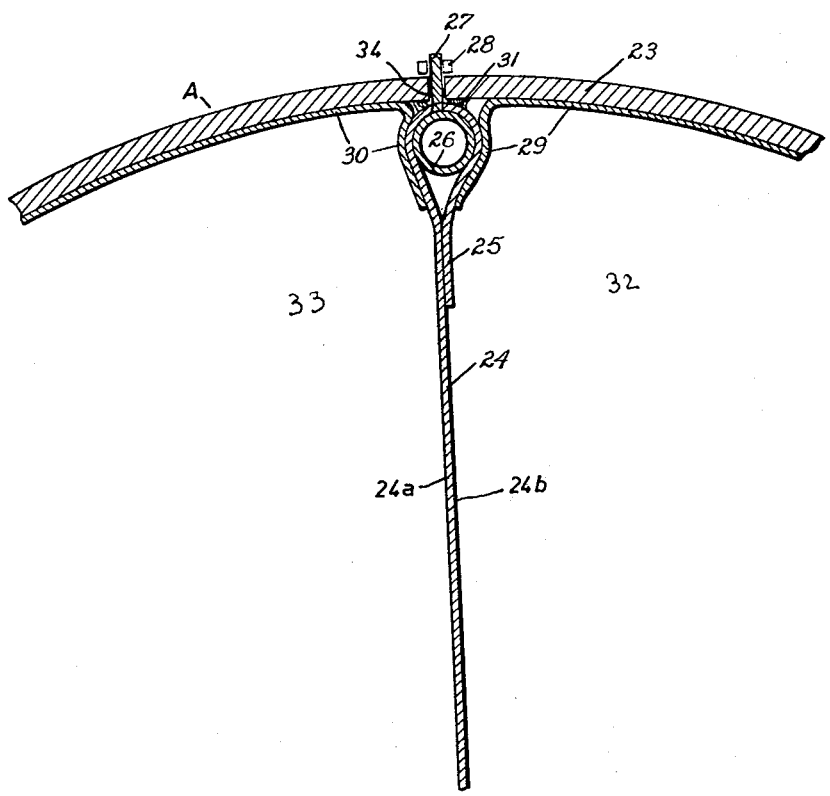
INVENTOR.
Gottfried Stiefel
BY Werner W. Kleeman
Attorney

United States Patent Office 3,172,556
Patented Mar. 9, 1965

3,172,556
MULTI-MATERIAL STORAGE AND
TRANSPORT TANK
Gottfried Stiefel, Zurich, Switzerland, assignor to Stag Staubgut-Transport A.G., Maienfeld, Switzerland, a corporation of Switzerland
Filed Oct. 24, 1960, Ser. No. 64,642
Claims priority, application Switzerland, Oct. 28, 1959, 79,963/59
5 Claims. (Cl. 220—22)

The present invention relates generally to a novelly constructed transport and storage container for fluent material and the like and, more particularly, to a transportable storage container adapted to be employed as a tank car and readily capable of successively handling at least two different materials while effectively making full use of the storage capacity of said container and without necessitating cleaning of the container interior subsequent to withdrawal of the first stored fluent material. It is to be understood that the terms "fluent" or "free-flowing" material as employed herein is intended to encompass liquids, powdery, granular, pulverulent, and gritty materials.

The selection of a suitable container is of considerable economic significance in the transport and storage of fluent or free-flowing materials. Of primary importance is the prevention of empty, that is to say, unused capacities of the storage container. This would generally occur if the storage container were initially filled with a first material and, for this reason, could not be subsequently loaded with a second material on the return trip in view of the fact that the remains or films deposited in the container interior by the first material would detrimentally affect the second material. Thus, by way of illustration, a tank car filled with mineral oil on the outgoing trip can generally not be used for transport of other materials, liquids or powdery, on the incoming trip without first cleaning the interior of the storage container. Such cleaning however is oftentimes not possible, or else, economically unfeasible since the layover and time loss in the use of both the workmen and the storage container would result in substantially higher costs than an empty return trip.

It has already been proposed to provide a rigid partition in conjunction with cylindrical containers for granular material, said partition separating and defining two compartments of similar size in the storage container. Each of these two compartments is provided with its own opening for filling and discharging of the material contained therein when the container is appropriately positioned. However, a major drawback in the use of such containers resides in the fact that the volume of both compartments is constant so that the total volume of the storage container can only be utilized when both of the compartments are filled.

Another proposed arrangement is to provide a bag-type insert formed of a flexible material in tanks used for storage and transport of liquids. Such an insert is provided with dual openings through which it may be filled or emptied. In its expanded or full condition, this flexible insert practically fills the entire volume of the storage tank. If the flexible insert is emptied, the storage tank may be filled via a further opening without allowing the material supplied to the tank to enter the inner bounds of said flexible insert. Instead, the material is caused to be located on the outer surface of the insert, between the latter and the rigid walls of the storage container. Since the flexible insert is rigidly connected to the tank only at its inlet and outlet openings difficulties will arise upon discharge of the chambers enclosed by the rigid walls of the storage container because the loosely arranged walls of the flexible insert will tend to at least partially enter and foul the outlet opening of said storage container. This is especially true when working with comparatively spacious tanks adapted to hold relatively large quantities of fluent material.

An arrangement of basket-type devices above the outlet opening of the storage container having rigid walls is designed to eliminate such difficulties. This proposed solution has only met with limited success and, even then, is successful to a certain extent only when a liquid and not a solid free-flowing or fluent material is employed. A further disadvantage of these known storage containers resides in the fact that the flexible insert when in empty condition is subject to considerable buckling and pinching at various points which are then stressed by the material deposited in the rigid wall container portion. This will, of course, exert undesirable wear on the flexible insert with the attendant result of frequent repairs and shutdowns.

In accordance with the teachings of the present invention, there is provided a storage container into which there is movably arranged an imperforate, flexible diaphragm or membrane which has its outer ends carried by the storage container. The flexible diaphragm is so mounted that it may move across the inner chamber of the storage container in such a manner as to define at least two separate storage compartments substantially equal in volume. By designing the flexible diaphragm as a sheet-like member laterally displaceable with respect to a central axis of the storage container it is possible to avoid fouling and pinching of the diaphragm in one of the provided orifices of said storage containers. Moreover, the flexible diaphragm or membrane, which defines a flexible partition wall, is preferably secured at its edges to the rigid storage container approximately at or directly in the largest cross section of the storage container. In this manner, the heretofore mentioned disadvantages of the prior art storage containers can be overcome. These and other advantages of the present invention are best achieved by employing a preferred embodiment of the present invention, wherein the connection between the flexible separating wall is effected about a tubular member or the like attached to the rigid container wall. The end of the diaphragm member to be secured is doubled over and secured around said tubular member so as to embrace the latter. The doubled over and secured end of the flexible diaphragm cooperates with the flexible layers of material to achieve a sealed connection with the rigid container wall. Additionally, various further proposed modifications teach the use of a plurality of such flexible, imperforate membranes to effectively provide storage and transport of numerous different materials.

The economic as well as utilitarian advantages of storage containers designed in accordance with the teachings of the present invention are readily apparent. The unique arrangement of the one or more flexible diaphragms in the interior of the storage container enable it to be alternately filled with various and differing fluent or free flowing materials without requiring a cleaning operation upon introduction of each successive material. This is accomplished by virtue of the fact that the portion of the storage container filled with a particular material and, respectively, the corresponding surface faces of the flexible diaphragm wall will only contact the material held in the respective expansible compartment of the container. The practical applications of the invention engender both the transport and storage of one or more materials in a safe and reliable manner. The storage container may, by way of example, be employed to transport cement on the trip out and fuel oil on the return trip. Other economically interesting pairings of goods for the two trips may be, by way of exemplification; crude oil and oil distillates, wine and beer, grain and chemicals. Moreover, the combination of crude oil and water may be of importance, for example, to improve stability during ocean transport by serving as a ballast.

Accordingly, it is an important object of the present invention to provide a novel storage container construction permitting transport and/or storage of a plurality of different fluent materials without requiring cleaning of the container interior subsequent to removal of each fluent material.

Another object of the present invention is the provision of means effectively dividing the interior of a storage container into at least two expansible compartments, each adapted to receive and hold separate and different materials.

Still a further object of the present invention is to provide means for supporting a flexible partition in a storage container in such a manner that said flexible partition may safely move laterally of its ends to define at least two expansible compartments adapted to store different fluent materials.

Yet a further object of the present invention is to provide means for separating a storage container into a plurality of compartments, each adapted to safely store different materials in succession without necessitating cleaning prior to introduction of successive materials.

A further important object of the present invention is to provide means for dividing the interior of a storage container, which may be transportable, into a plurality of expansible storage compartments, wherein each of said storage compartments is defined by a portion of the rigid wall of said storage container and one face of a flexible partition member.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 is a cross-sectional view of a spherical container provided with the flexible partition member forming a pair of expansible storage compartments pursuant to the teachings of the present invention;

FIGURE 1a is a sectional view taken through the spherical container of FIGURE 1 showing the details of a securing ring for fastening together two hemispherical halves defining the storage container;

FIGURE 2 is a cross-sectional view of the storage container illustrated in FIGURE 1 but provided with a plurality of flexible partitions defining five potential expansible compartments;

FIGURE 3 is a cross-sectional view of a silo storage container provided with a flexible partition forming a pair of expansible storage compartments;

FIGURE 3a is a plan sectional view of the silo container shown in FIGURE 3 taken along the line B—B of FIGURE 3;

FIGURE 4 diagrammatically illustrates a cylindrical storage container provided with a flexible partition according to the teachings of the present invention;

FIGURE 4a diagrammatically illustrates a cross-sectional view of the cylindrical storage container shown in FIGURE 4 and taken along the line C—C thereof;

FIGURE 4b is a plan longitudinal, cross-sectional view of the cylindrical storage container shown in FIGURE 4 and taken along line D—D thereof;

FIGURE 5 diagrammatically illustrates a storage tank according to FIGURE 4 with the flexible partition arranged in a different manner;

FIGURES 5a is a diagrammatical cross-sectional view taken along line A—A of FIGURE 5;

FIGURE 6 is a diagrammatic longitudinal section of a storage tank similar to that shown in FIGURE 4 and provided with two flexible partitions according to the teachings of the present invention;

FIGURE 6a is a cross-sectional view of the storage tank shown in FIGURE 6; and

FIGURE 7 is a fragmentary sectional view of a preferred means of attachment of the flexible partition for any of the hereinabove noted embodiments of the storage container.

Referring now to the drawings and, more particularly to FIGURES 1 to 2 thereof, there is shown a spherical shaped container A constituted by the hemispheric shells 1 and 1a adapted to be positioned contiguous to one another and secured together by a securing flange 11 to form said spherical container A. Each of the shell halves 1 and 1a is provided with a flanged neck portion 2a which in its assembled position defines a manhole or opening 2 permitting access to the interior of the storage container A. The securing flange 11 may preferably be formed of a pair of complementary rings 11a and 11b adapted to be arranged in abutting relation and so secured together by means of suitable fastening means, such as bolts 11c receivable in the circumferentially spaced apertures 11d. A flexible partition wall in the form of a sheet-like flexible, imperforate diaphragm or membrane 7, which in the illustrated embodiment is preferably in the form of a hemisphere, is secured or clamped at its outer periphery or ends between the abutting rings 11a and 11b of the securing flange 11.

The flexible diaphragm 7 is disposed internally of the container A in such a manner that it may move laterally of the supporting securing flange 11 to define a pair of expansible compartments 9 and 10. Each of the respective expansible compartments 9 and 10 is defined by a portion of the rigid inner wall 1b of the container A and one face of the flexible diaphragm 7. The diaphragm 7 is preferably arranged at the largest cross-section of the container in order to improve its ability to move laterally of the supporting flange 11. Additionally, each of the shell halves 1 and 1a provided with the inlet openings 3 and 4 and outlet openings 5 and 6, which openings may be closed by means of suitable sealing caps (not shown). The manhole opening 2 is also provided with a cover 2b normally obturating the interior of the storage container A.

The storage container A may, preferably, be formed of sheet-metal, as for example, steel or aluminium. The volume and space occupied by the flexible diaphragm 7 is small in comparison with the total volume of the storage container A so that for all practical purposes it can be neglected, whereby the volume of the expansible compartment 9 formed by the rigid wall 1b and the diaphragm 7 when in its flush position against the inner wall of the shell 1a (as shown in FIGURE 1) approximates and equals the volume of the storage container A. Similarly, the expansible compartment 10 formed when the diaphragm member 7 is flush against the rigid wall 1b also equals the total volume of the storage container A.

The expansible compartment 9 may be filled with a fluent material via the opening 3 and emptied via the opening 5. This compartment 9 may be emptied by discharging its contents under the influence of its hydrostatic pressure, exhausting by means of applying suction or further by the application of an external pressure. This external pressure may, for example, be applied via the inlet opening 4, it being immaterial whether such pressure is obtained by a compressed gas or by the influx of a second material into the expansible compartment 10. In other words, the emptying and filling of the separate expansible compartments 9 and 10 may be advantageously coupled and made interdependent to one another. As a result, this may serve to save time and labor during the filling and emptying stages of the storage container A. Of course, other modes of securing the flexible diaphragm 7 to the storage container A may be employed. Thus, for example, such attachment may also be carried out by any of the known processes of welding, cementing, curing, bolting, riveting and the like.

In FIGURE 2 there is disclosed a cross-sectional view of a spherically shaped storage container A similar in construction to the storage container of FIGURE 1. In the interior of the storage container A, there are arranged four flexible partitions 12, 13, 14 and 15 consisting of the flexible, imperforate diaphragm defining the five potential expansible chambers or compartments. The flexible partitions 12, 13, 14 and 15 may be jointly clamped in a manner as previously described with respect to FIGURE 1, or alternatively, intermediate rings may be inserted such that each flexible partition is individually clamped in a securing flange while the intermediate ring is provided with one or several inlet openings for a potential expansible compartment.

In FIGURE 3 there is disclosed a storage container A in the form of a silo which may be filled from above through the intermediary of the openings or apertures 17 and 18 adapted to be covered by the hinged and pivotably movable cover members 17a and 18a, respectively. At the bottom of the storage container A there is arranged the outlet openings 19 and 20 adapted to be closed by the cap members 19a and 20a, respectively. A flexible, imperforate diaphragm member 22 is supported internally of the storage container A and at the largest cross-section thereof. The storage container A may be formed of two shells 21a and 21b secured together by a suitable securing flange (not shown) similar to the arrangement of FIGURE 1, or else, may be a unitary container with the flexible partition 22 movably mounted therein in a manner as will be described in greater detail hereinafter. The flexible diaphragm 22 is formed of a sheet-like membrane having the configuration of a trough. The diaphragm 22 is supported in such a manner that it may freely move laterally of the central plane of the storage container A to define the expansible compartments 21 and 22a in a manner already detailed hereinabove. Each of the expansible compartments 21 and 22a, respectively, may be fully or partially emptied by means of the discharge openings 19 and 20, respectively. As can be seen from the drawing, the left-hand compartment 21 has been filled with grain or another free flowing foodstuff as, for example, powdered egg or the like by means of the opening 17. The flexible partition 22 upon filling of the compartment 21 is forced against the inner wall 21c of the storage container A. The openings 18 and 19 are sealed off from the material located in the compartment 21.

In FIGURES 4, 4a and 4b there is shown a horizontally arranged cylindrical storage container A, preferably formed of the shells 40 and 41 and secured together by means of a suitable securing flange (not shown) in a manner similar to that disclosed in FIGURE 1. A flexible partition member in the form of the imperforate diaphragm 42 is again supported internally of the storage container A at the largest cross-section thereof and is adapted to move laterally therein to define the expansible chambers 43 and 44. The flexible diaphragm 42 is formed as a semi-cylindrical member. The storage container A is further provided with the respective inlet openings 45 and 46 and the outlet openings 47 and 48 for filling and emptying of the respective compartments 43 and 44. Laterally of the end walls 49 and 50 of the storage container A there are arranged further openings 51 and 52 adapted to permit introduction of a suitable medium to aid the displacement of the diaphragm member within the storage container A and for emptying and filling of the respective compartments. Such medium may, of course, be the material to be stored in the container A as already noted with respect to the description of FIGURE 1. The operation of this embodiment of the invention is similar to that disclosed hereinabove.

In FIGURES 5 and 5a there is diagrammatically illustrated a storage container A similar to the storage container of FIGURE 4 but provided with a flexible partition 53 in a shape of a cylindrical cup which is mounted adjacent and between the upper and lower walls 54 and 55 of said storage container A, in contradistinction to the arrangement of FIGURE 4, wherein the flexible diaphragm 42 is annularly supported from the end walls 49 and 50 of the storage container A. It has been found that in general the shape and arrangement of the flexible partition 42 shown in FIGURE 4 is more advantageous, since its travel during its displacement from one container half into the other is shorter than in the embodiment of FIGURE 5, wherein the bottom end 53a of the flexible partition 53 has to move throughout the entire length of the container A when displaced. Additionally, in the design and arrangement according to FIGURE 5, portions of the flexible partition 53 might tend to buckle during changing of the material stored. Naturally, the selection of the type of material for, as well as the arrangement and shape of, the flexible partition to be employed will have to be determined in accordance with the conditions of use and the particular shape of the storage container A.

In FIGURE 6 there is diagrammatically illustrated a cylindrical and horizontally arranged storage container A provided with a pair of flexible partitions in the form of the imperforate diaphragms 60 and 61 forming three potentially expansible compartments 62, 63 and 64. Each of the compartments 62, 63 and 64 is provided with a respective inlet opening 65, 66 and 67 and a respective outlet 68, 69 and 70. The two flexible partitions 60 and 61 are designed in a form of semi-cylinders in a manner similar to that of FIGURE 4. Attachment of the flexible partitions 60 and 61 to the storage container A may be carried out by using clamping members similar to those shown in FIGURE 1 or by any other method known in the art. In FIGURES 4 to 6, there is advantageously shown, by way of example, a provision of an annularly extending strip 71 which may be welded or secured in any known manner to the inner surface of the storage container A, said strip being designed and adapted for attachment of the flexible partitions 42 and 53 as by clamping or bolting. It is also possible to equip such flexible partitions with a stiffening member that serves for attachment and which may be of advantage when the partition member has to be replaced after prolonged use.

Although, it is possible to secure the flexible partition members to the wall for the storage container A in any number of different ways, in FIGURE 7 there is shown a preferred arrangement for attaching a flexible partition or diaphragm 24 to the wall 23 of the container A. The hereinbelow described mode of attaching one or more of the flexible partition members 24 is particularly effective in insuring against rupture of said partition members, while simultaneously permitting unhampered movement of the same internally of the storage container A. To this end, there is provided an annularly extending tubular support 26 which is carried by and circumjacent the wall 23 of the storage container A and may, for example, be formed of iron. The outer end 25 of the flexible partition or diaphragm 24 is looped around said tubular member 26, so as to embrace the latter and is connected to the flexible partition 24 by a curing process if said flexible partition is formed of rubber, or by welding if the same is formed of a thermoplastic synthetic material. The tubular member 24 is provided with bolt means 27 which passes through the bore means 34 provided in the wall 23 of the storage container A and is securely fixed by means of the nut member 28. As will be readily apparent the bolt means 27 may also be welded or keyed to the wall 23 of the container A.

In order to effectively and safely seal the expansible compartment 33 appearing on the left side or face 24a of the flexible diaphragm 24, which may contain cement, from the expansible compartment 32 appearing on the right side or face 24b of said diaphragm, which may contain oil, the flexible diaphragm or partition 24 is rigidly secured, by way of example, by cementing in the region adjacent the tubular member 26 to the jacket members 29 and 30 also formed of a flexible material. The jacket members 29 and 30 may also in turn be fastened by cementing to the wall 23 of the container and, may preferably, cover the entire inner surface of said wall. Such a wall covering 29 and 30 may be of particular advantage for storage containers working with and transporting active and aggressive types of chemicals. If the wall 23 is formed, by way of example, of a fabric-reinforced rubber sheet having a wall thickness of 5 mm., the members 29 and 30 which may be, for example, formed of reinforced or plain rubber sheeting having a wall thickness of about 1 mm. may be attached by a curing process. Thus, the compartment 33 of the storage container A may serve to transport cement, whereas the compartment 32 serves to transport an inorganic acid. In such a case, it will therefore be advantageous to only completely line the compartment 32 with the rubber sheet member 29, while the member 30 may be merely designed in the form of a strip and leaves the larger portion of the wall 23 of the compartment 33 uncovered. It is readily to be appreciated that the preferred mode of attachment for one or more diaphragm members described in FIGURE 7 may be effectively employed in conjunction with any of the embodiments described and shown with reference to FIGURES 1–6a inclusive.

Additionally, a protective padding or strip 31, for example, of foam material or soft rubber may be provided. Its purpose is mainly to protect the wall 23, since said flexible partition may twist about the tubular member 26 and, therefore, rub against the container wall 23 when being displaced from one side of the storage container A to the other. The flexible partitions 24 may be formed of any material impervious to the free-flowing material employed. Coated fabrics have been found to be particularly suitable. The coat may consist of a suitable natural, or synthetic polymer such as synthetic or natural rubber, polyethylene, polyvinyl chloride, polyamide, polyethyleneglycol terephthalate, polytetrafluorethylene and the like, of cellulose or its derivatives (e.g. fabrics and the like), of flexible sheet-metal; while the fabric in the construction of a common industrial fabric may serve as a reinforcement of the coat. In most practical cases, a gas and liquid impervious coat will be desirable.

Moreover, foils or correspondingly thick films may be used without fabric reinforcement if they adequately possess favorable properties such as mechanical strength, flexibility and elasticity, which is the case with the above laminated materials. Foils formed of the material cited above may also be selected for their chemical resistance, by way of example, against aggressive chemicals such as acids, or swelling agents such as oils. It may also be desirable to render the wall 23 of the container resistant to, or to cushion it against, the charge or material introduced by applying a suitable (e.g. synthetic or natural) coating so that the flexible partitions 24 may be protected. In general, it must be attempted to prevent buckling and bending of the flexible partition 24 as far as possible, since this naturally causes more rapid wear and tear thereof when employing certain free-flowing materials.

The arrangement of the flexible partition in the storage container A is generally so selected that the plane in which said flexible partition is connected firmly with the storage container A is located in the largest cross-section because the mobile portion of the said partition travels along the shorter path and will be caused to more intimately engage the wall of the container A. The attachment should be such as to ensure that, in the two positions, the flexible partition rests on the surface or wall of the container practically without any creases or folds. The shape of the container may preferably be spherical or cylindrical. If angular configurations are used, sharp edges should be avoided and the same should be rounded.

While materials are commonly employed for transport containers which combine an adequate mechanical strength with a relatively low weight, for example by using metals such as steel, aluminium, plastics and the like, stationary containers may also be formed of wood, brickwork and concrete as usual with various storage containers such as silos. The transport containers formed of metal may also be designed as pressure vessels able to withstand an overpressure of e.g., 0 to 200 gauge atmospheres. It is to be appreciated that the storage container constructed in accordance with the teachings of the present invention may be employed to simultaneously or successively store one or more fluent materials. Additionally, such storage container may be either stationary or transportable.

Having thus described the present invention what is desired to be secured by United States Letters Patent is:

1. In a storage container or the like adapted to transport and store a plurality of different fluent materials; a container having rigid inner walls, at least one imperforate and flexible partition member movably supported by said rigid inner walls internally of said container and in spaced relation from said rigid inner walls to define at least a pair of expansible compartments adapted to store different materials, each of said expansible compartments being defined by a portion of said rigid inner walls and one face of said flexible partition member, supporting means for said flexible partition member including a tubular member arranged around and adjacent said rigid inner wall at substantially the largest cross section thereof and carried by said rigid inner wall, said flexible partition having edge portions flexed about said tubular member and fastened to said flexible partition member to define a closed loop encircling said tubular member and spaced from said rigid inner walls, and separate strip means secured at one end to opposite faces of said flexible partition member adjacent said tubular member, the other end of each of said separate strip means extending into one of said expansible compartments and secured to the rigid inner wall thereof, said supporting means permitting movement of said flexible partition member within said container through a region of smaller cross section without subjecting said flexible partition member to extreme conditions of fatigue.

2. In a storage container or the like adapted to transport and store a plurality of different fluent materials according to claim 1, wherein said separate strip means entirely cover the rigid inner walls of the respective expansible compartments.

3. In a storage container or the like adapted to transport and store a plurality of different fluent materials according to claim 2, wherein protective padding for said flexible partition member is carried on said rigid inner walls adjacent said tubular member.

4. In a storage container or the like adapted to transport and store a plurality of different fluent materials according to claim 3 wherein said container is designed as a pressure vessel.

5. In a storage container or the like adapted to transport and store a plurality of different fluent materials; a container having rigid inner walls, at least one imperforate and flexible partition member movably supported in a substantially vertical position by said rigid inner walls and disposed completely internally of said container to define at least a pair of expansible compartments adapted to store different materials, each of said expansible compartments being defined by a portion of said rigid inner walls and one face of said flexible partition member, supporting means for said flexible partition member arranged in a substantially vertical plane and including a tubular member arranged around and adjacent said rigid inner wall at substantially the largest cross section thereof and carried by said rigid inner wall, said flexible partition having edge portions flexed about said tubular member and fastened to said flexible partition member to define a closed loop encircling said tubular member and spaced from said rigid inner walls, and separate strip means secured at one end to opposite faces of said flexible partition member adjacent said tubular member, the other end of each of said separate strip means extending into one of said expansible compartments and secured to the rigid inner wall thereof, said supporting means permitting lateral movement of said flexible partition member within said container through a region of smaller cross section without subjecting said flexible partition member to extreme conditions of fatigue.

References Cited by the Examiner

UNITED STATES PATENTS

| | | | |
|---|---|---|---|
| 2,257,941 | 10/41 | Ellis | 220—85 |
| 2,399,803 | 5/46 | Herbert | 220—85 |
| 2,628,673 | 2/53 | Ericson. | |

FOREIGN PATENTS

| | | |
|---|---|---|
| 682,016 | 2/30 | France. |
| 932,322 | 11/47 | France. |
| 565,908 | 8/57 | Italy. |

THERON E. CONDON, *Primary Examiner.*
EARLE J. DRUMMOND, GEORGE O. RALSTON,
*Examiners.*